(12) United States Patent
Soriano

(10) Patent No.: US 8,867,081 B2
(45) Date of Patent: Oct. 21, 2014

(54) PRINTING METHOD AND APPARATUS FOR DIVIDING EACH OF THE TWO OR MORE PRINT JOBS INTO A PLURALITY OF SUB-PRINT JOBS

(71) Applicant: Randy Cruz Soriano, San Leandro, CA (US)

(72) Inventor: Randy Cruz Soriano, San Leandro, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/835,835

(22) Filed: Mar. 15, 2013

(65) Prior Publication Data

US 2014/0268216 A1    Sep. 18, 2014

(51) Int. Cl.
*G06F 3/12* (2006.01)
*G06K 15/02* (2006.01)

(52) U.S. Cl.
CPC .......... *G06F 3/1296* (2013.01); *G06K 15/1803* (2013.01)
USPC ........................................................ 358/1.15

(58) Field of Classification Search
CPC .......................... G06F 3/1296; H04N 1/00204
USPC ........................................................... 358/1.15
See application file for complete search history.

(56) References Cited

U.S. PATENT DOCUMENTS

| 2009/0185212 A1* | 7/2009 | Gustafson et al. | 358/1.15 |
| 2012/0050792 A1* | 3/2012 | Uozumi | 358/1.15 |
| 2012/0057187 A1* | 3/2012 | Sakurai et al. | 358/1.13 |

* cited by examiner

*Primary Examiner* — Qian Yang
(74) *Attorney, Agent, or Firm* — Buchanan Ingersoll & Rooney PC

(57) ABSTRACT

A method of managing plural print jobs is disclosed, the method includes receiving two or more print jobs on an image forming apparatus; dividing each of the two or more print jobs into a plurality of sub-print jobs for printing by a print engine of the image forming apparatus; determining an estimated processing time and an estimated delay to print time for each of the sub-print jobs; managing the printing of each of the two or more print jobs based on the estimated processing time and the estimated delay to print time for each of the sub-print jobs by determining a printing priority for the two or more print jobs based on a printing sequence, which reduces down time of the print engine of the image forming apparatus; and printing the two or more print jobs based on the determined printing priority.

18 Claims, 10 Drawing Sheets

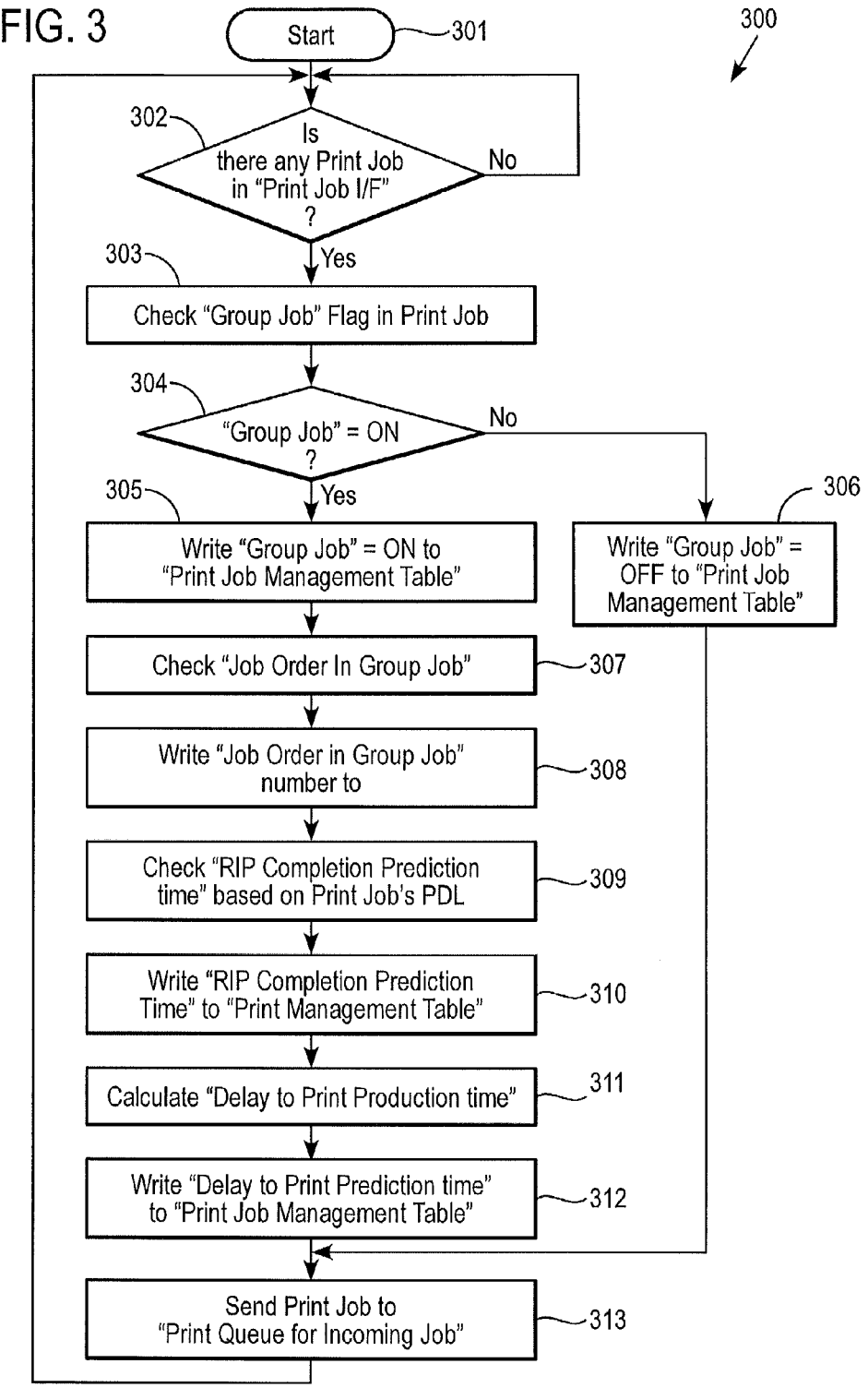

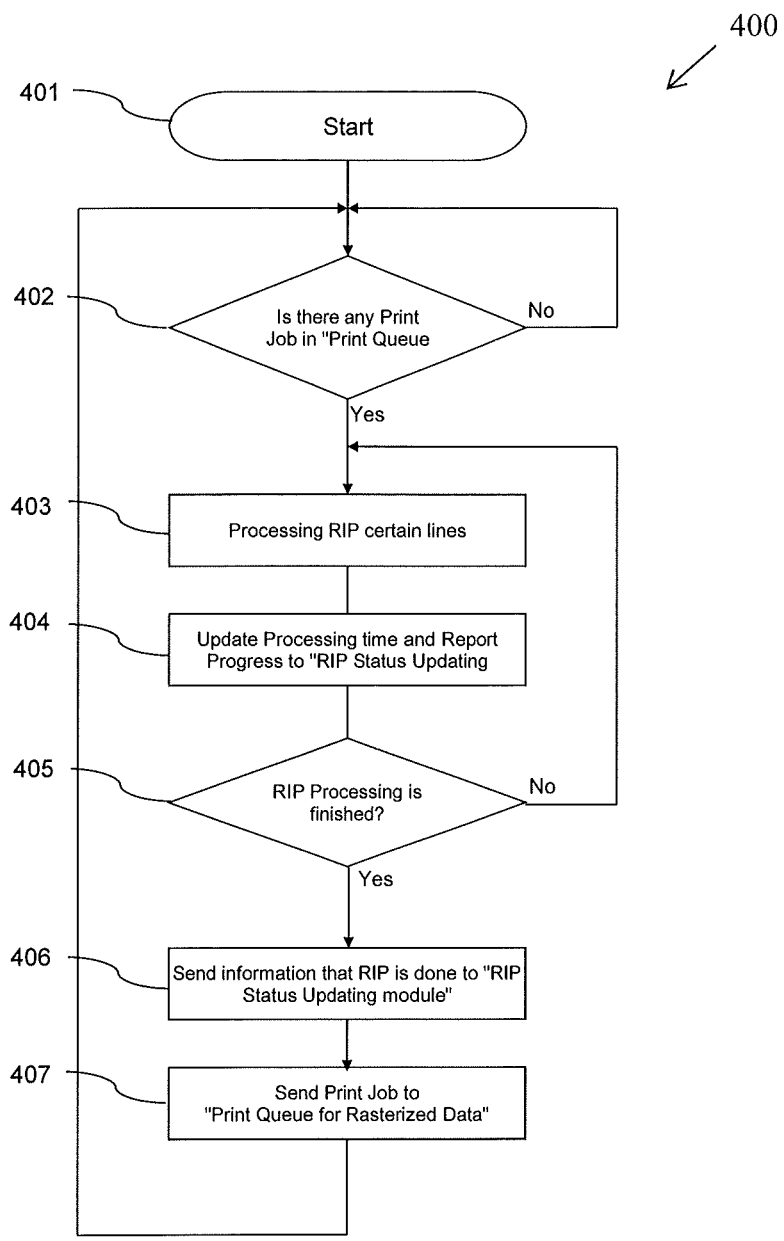
Fig.4 (206)

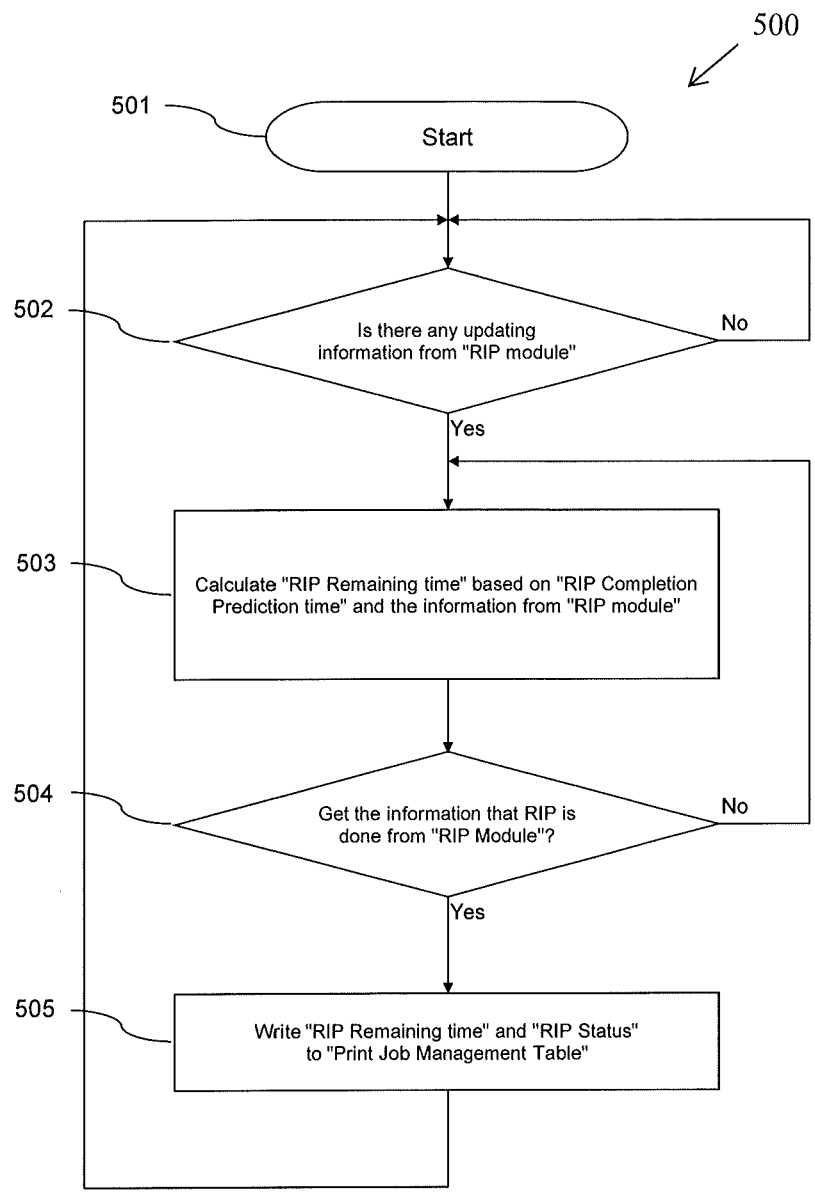
Fig.5 (207)

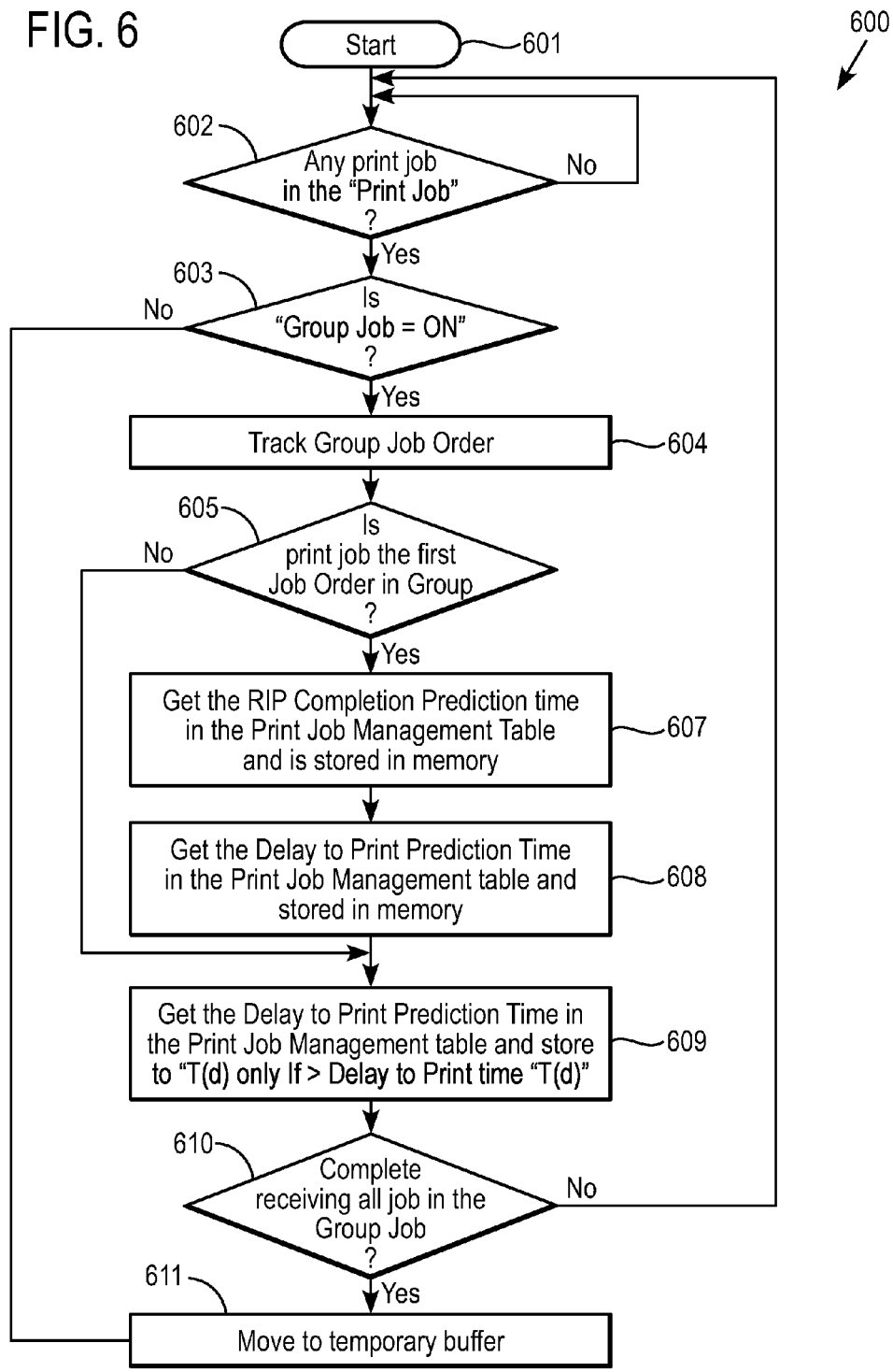

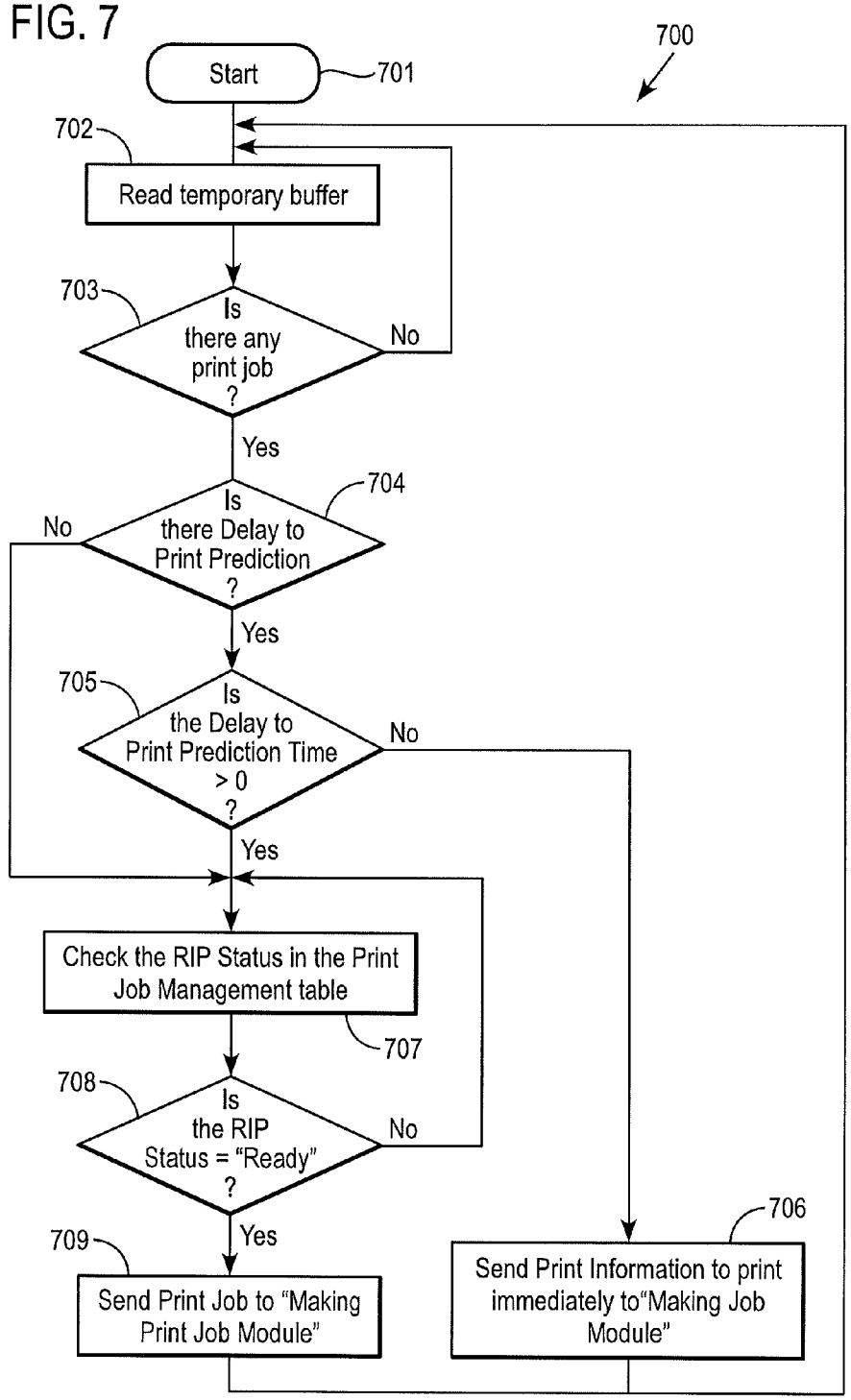

PRINTING METHOD AND APPARATUS FOR DIVIDING EACH OF THE TWO OR MORE PRINT JOBS INTO A PLURALITY OF SUB-PRINT JOBS

FIELD OF THE INVENTION

The present invention relates to a system and method of managing plural print jobs, and more particularly, a system and method of managing a group or plurality of print jobs including sub-jobs, which can be achieved by monitoring the processing (or RIP) status for each of the sub-jobs using a print job management module.

BACKGROUND OF THE INVENTION

In today's print on demand, a print job can be generated, which may contain several pages of text and images of various complexities. These complex jobs can heavily require and occupy long processing time (i.e., raster image processing or "RIP" time) on the printing device. In sequences of print jobs, this can become a bottleneck for other jobs waiting to be processed or RIPped as the printing device has to complete ripping of the current complex job before it can proceed to the subsequent print job.

One related method to managing print job of various complexities is to divide or split the print job into multiple sub-print jobs which can be processed simultaneously, thereby, reduce total processing time. The sub-print jobs can then be stored temporarily in the printing device storage such as hard disk or memory and employing a print job control module to manage these sub-print jobs. The print job control module monitors the receiving and processing of the print job. Every time a sub-print job is processed and ready to print, the sub-print job can then be released for printing. With this method, subsequent print jobs with lesser complexities can be processed in lesser wait time.

While this method can address processing of subsequent print jobs, the method cannot prevent delays that may occur in-between the sub-print jobs during the course of printing the print job entirely. In order for the whole of the print job to be printed entirely it has to wait until all sub-print jobs have been processed. If a sub-print job takes a long time to process and causes the print engine to wait until the sub-print job becomes ready for printing, it will affect the over-all printing performance as subsequent print job has to wait.

SUMMARY OF THE INVENTION

In consideration of the above issues, it would be desirable to improve the management or processing of two or more print jobs, each of the two or more print jobs having sub-jobs (or sub-print jobs) by monitoring the processing (or RIP) status for each of the sub-jobs using a print job management module and/or a printer controller to establish a printing priority for the two or more print jobs so that the print jobs that can be processed without causing cycling down, waiting, and/or delay of the print engine during processing of the two or more print jobs.

In accordance with an exemplary embodiment, a method of managing plural print jobs is disclosed, the method comprising: receiving two or more print jobs on an image forming apparatus; dividing each of the two or more print jobs into a plurality of sub-print jobs for printing by a print engine of the image forming apparatus; determining an estimated processing time and an estimated delay to print time for each of the sub-print jobs; managing the printing of each of the two or more print jobs based on the estimated processing time and the estimated delay to print time for each of the sub-print jobs by determining a printing priority for the two or more print jobs based on a printing sequence, which reduces down time of the print engine of the image forming apparatus; and printing the two or more print jobs based on the determined printing priority.

In accordance with a further exemplary embodiment, an image forming apparatus having executable instructions for managing a plurality of print jobs is disclosed, the instructions comprising: receiving two or more print jobs on the image forming apparatus; dividing each of the two or more print jobs into a plurality of sub-print jobs for printing by a print engine of the image forming apparatus; determining an estimated processing time and an estimated delay to print time for each of the sub-print jobs; managing the printing of each of the two or more print jobs based on the estimated processing time and the estimated delay to print time for each of the sub-print jobs by determining a printing priority for the two or more print jobs based on a printing sequence, which reduces down time of the print engine of the image forming apparatus; and printing the two or more print jobs based on the determined printing priority.

In accordance with another exemplary embodiment, a computer program product comprising a non-transitory computer usable medium having a computer readable code embodied therein for managing a plurality of print jobs on an image forming apparatus is disclosed, the computer readable program code configured to execute a process, the process comprising the steps of: receiving two or more print jobs on an image forming apparatus; dividing each of the two or more print jobs into a plurality of sub-print jobs for printing by a print engine of the image forming apparatus; determining an estimated processing time and an estimated delay to print time for each of the sub-print jobs; managing the printing of each of the two or more print jobs based on the estimated processing time and the estimated delay to print time for each of the sub-print jobs by determining a printing priority for the two or more print jobs based on a printing sequence, which reduces down time of the print engine of the image forming apparatus; and printing the two or more print jobs based on the determined printing priority.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 3 is an illustration of flowchart describing the process of the group checking module and the RIP completion time prediction module in accordance with an exemplary embodiment.

FIG. 4 is an illustration of flowchart describing the process in the RIP module in accordance with an exemplary embodiment.

FIG. 5 is an illustration of a flowchart describing the process in the RIP status updating module in accordance with an exemplary embodiment.

FIG. 6 is an illustration of a flowchart describing the process in the print job controller in accordance with an exemplary embodiment.

FIG. 7 is an illustration of a flowchart describing the process of print job order in the print job controller in accordance with an exemplary embodiment.

DESCRIPTION OF THE PREFERRED EMBODIMENTS

Figure 1A:
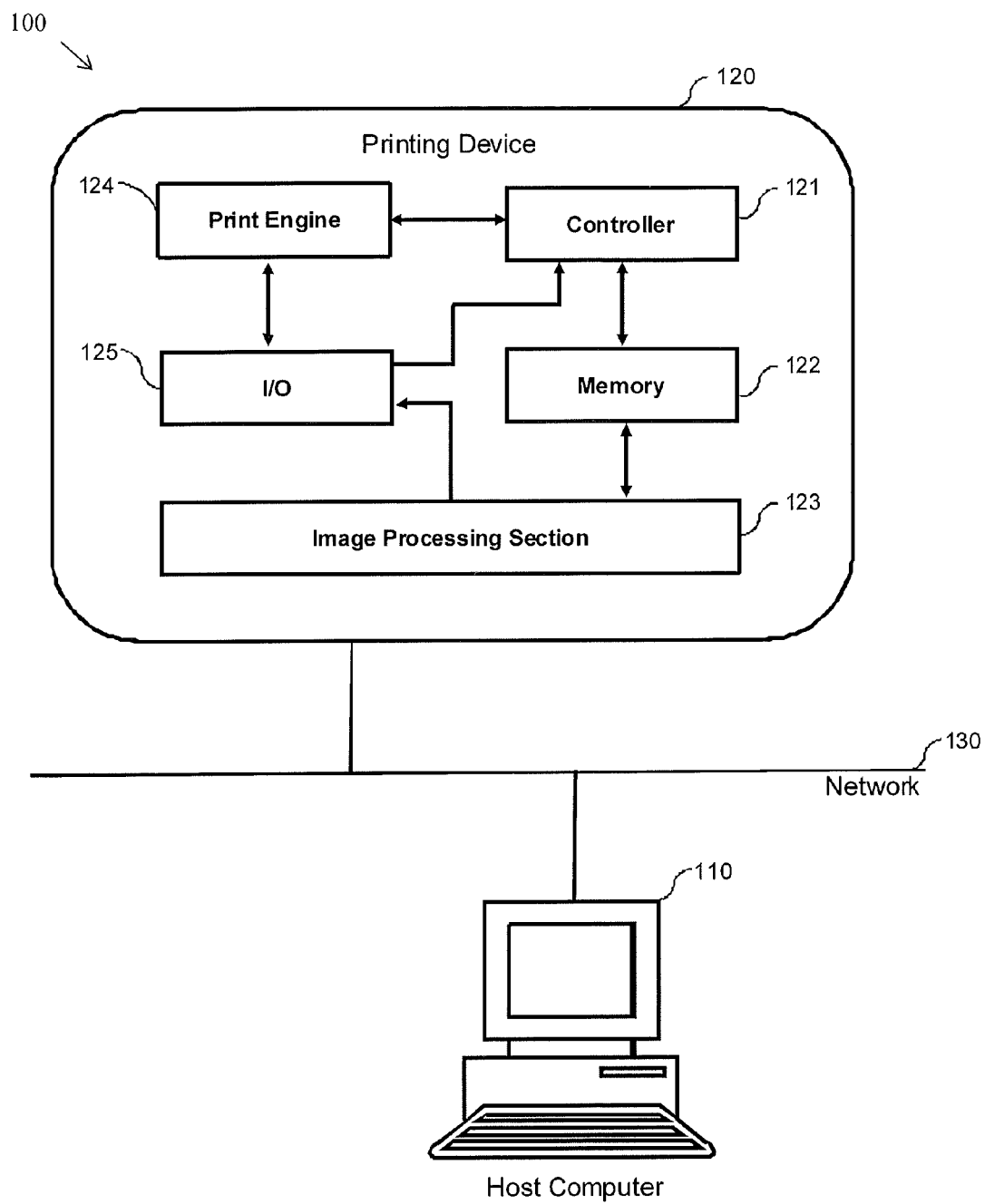
FIG. 1A is an illustration of a data processing system, which includes a client device in the form of a computer device and an image forming apparatus or printer.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, it can be appreciated that one method to manage a very complex job is to divide a print job into multiple sub-jobs, thereby, allowing faster ripping. These sub-jobs can then be stored in the printing device storage such as hard disk and by using a print job management module to manage these sub-jobs to improve printer performance. In accordance with an exemplary embodiment, the print job management module can allocate a group of modules that serves as a collection for the ripped sub-jobs until the whole of the print job has received. When the whole of the print job has been received and is ready to print, the print job management module releases the print job for printing. It can be appreciated that with this method, subsequent print jobs with lesser complexities can be ripped or processed with much less wait time.

In order for the whole of the print job to be released for printing, the print job has to wait until all of the sub-jobs have been received by the print engine. In case of processing (ripping) the sub-jobs in parallel, processing of less complex sub-jobs will be finished faster than the processing of more complex sub-jobs regardless of the desired print order, which may induce disordering of the sub-jobs.

In accordance with an exemplary embodiment, a method and system for managing subsequent print jobs so that print job that can be processed and printed without print engine waiting is disclosed. In accordance with an exemplary embodiment, the print job will be divided into multiple sub-print jobs. The sub-print job is analyzed for a determination of an estimated processing time and delay to print time. In accordance with an exemplary embodiment, the complete analysis of print job can be compare to a subsequent print job to determine a printing priority between the two or more print jobs.

In accordance with an exemplary embodiment, if a print job consisting of a plurality of sub-print jobs, and it is determined that one of the plurality of sub-print jobs of the print will require a long and/or extended processing time, and may cause or have an effect on the print engine by requiring the print engine to wait and cycle down, the print job can be given a lower priority in order of printing of a plurality of print jobs. In accordance with an exemplary embodiment, if a print job consisting of a plurality of sub-print jobs can be processed in a timely manner, which allows the print engine to maintain a maximum or desired throughput, the print job having a maximum or desired throughput can be given priority within one or more print jobs.

For example, given the sequence of print job 1 and print job 2, divided into multiple sub-print jobs 1-1, 1-2, 1-3, 1-4 and 2-1, 2-2, 2-3, 2-4 respectively. The sub-print jobs are processed simultaneously. The time it takes to complete processing the sub-print jobs 1-1, 1-2, 1-3, 1-4, 2-1, 2-2, 2-3, 2-4 estimated as 2, 10, 1, 2, 3, 3, 5, 8 seconds respectively. The total time to process print job 1 is less than print job 2. However, print job 1 consisting sub-print job 1-2 contains very complex data which takes long time to process can be the bottleneck if print job 1 is immediately send to print and causes the printer engine to wait until sub-print job is completely processed and ready to print. Even if, print job 1 total processing time takes less than print job 2, the over-all print completion time suffers. However, analysis of print job 2 can prepare all the consisting sub-print jobs for printing on time without any delay to the print engine. In accordance with an exemplary embodiment, the print job management module can determine that print job 2 should be printed prior to the printing of print job 1.

FIG. 1A is an illustration of a typical data processing system 100, which includes a client device (or computer device) 110 and an image forming apparatus 120 (or printer) connected to the client device 110. The client device 110 preferably includes a processor or central processing unit (CPU), one or more memories for storing software programs and data (such as files to be printed). The client device 110 also includes an operating system (OS), which manages the computer hardware and provides common services for efficient execution of various software programs. The processor or CPU carries out the instructions of a computer program, which operates and/or controls at least a portion of the functionality of the client device 110. It can be appreciated that examples of client devices 110 include and are not limited to personal computers, image forming apparatuses, routers, and/or personal digital assistants (PDAs).

In accordance with an exemplary embodiment, the image forming apparatus 120 is preferably in the form of an industrial image forming apparatus or multi-functional printer 120 connected to the client device 110. The client device 110 submits print jobs to the image forming apparatus (printer or printing device) 120 by transmitting data representing the documents to be printed and information describing the print job. As shown in FIG. 1A, the image forming apparatus (for example, printer/printing device) 120 typically includes a printer controller (or firmware) 121, a memory section 122 preferably in the form of a hard disk drive (HDD), an image processing section (or data dispatcher) 123, a print engine 124, and an input/output (I/O) section 125.

The controller 121 typically includes a central processing unit (CPU), a random access memory (RAM), and a read only memory (ROM). The central processing unit is configured to execute a sequence of stored instructions (i.e., a computer program). It can be appreciated that the controller 121 also includes an operating system (OS), which acts as an intermediary between the software programs and hardware components within the image forming apparatus 120. The operating system (OS) manages the computer hardware and provides common services for efficient execution of various application software. In accordance with an exemplary embodiment, the controller 121 processes the data and job information received from the client device 110 to generate a print image.

The image processing section 123 carries out image processing under the control of the controller 121, and sends the processed print image data to the print engine 124. In one embodiment, the image processing section 123 is preferably capable of processing multiple print jobs or sub-jobs in parallel and independently. For instance, the image processing section 123 can include a CPU that contains multiple cores therein to realize the multiple RIP modules explained in detail later. The CPU used constituting a part of the controller can be commonly used for the image processing section. The print engine 124 forms an image on a recording sheet based on the image data sent from the image processing section. The I/O section 125 performs data transfer with the client device 110. The controller 121 is programmed to process data and control various other components of the image forming apparatus or printer to carry out the various methods described herein. The hard disk drive (HDD) or storage device stores digital data and/or software programs for recall by the controller. In accordance with an exemplary embodiment, the digital data includes resources, which can include graphics/images, logos, form overlays, fonts, etc.

The input/output (I/O) port 125 provides communications between the printer section and the client device 110 and receives page descriptions (or print data) from the host for processing within the image forming apparatus 120. In accordance with an exemplary embodiment, the operation of printer section commences when it receives a page description from the client device 110 via I/O port in the form of a print job data stream. The page description may be any kind of page description languages (PDLs), such as PostScript® (PS), Printer Control Language (PCL), Portable Document Format (PDF), XML Paper Specification (XPS), and so on. Examples of image forming apparatuses 120 consistent with exemplary embodiments of the invention include industrial printers, and/or multi-function printers or peripherals (MFP).

The client device 110 and the image forming apparatus (or printing device) 120 are preferably connected to one another via a network 130. Examples of the network 130 consistent with embodiments of the invention include, but are not limited to, the Internet, an intranet, a local area network (LAN) and a wide area network (WAN). The client device 110 and the image forming apparatus 120 can also be connected with a wire and/or wireless technology by using radio frequency (RF) and/or infrared (IR) transmission.

As shown in FIG. 1A, in accordance with an exemplary embodiment, the client device (or host computer) 110 sends a plurality or series of print jobs to a printing device or image forming apparatus 120. The plurality or series of print jobs are transmitted or sent by the client device 110 and received by the printing device 120, which may come in the same order. However, depending on complexities of each of the print jobs, less complex print jobs can be processed (or RIPped) faster than other print jobs and become available for printing before the more complex print jobs. Therefore, in some circumstances, the printing of the print job (or print job orders) can change after the RIP process.

Figure 1B:
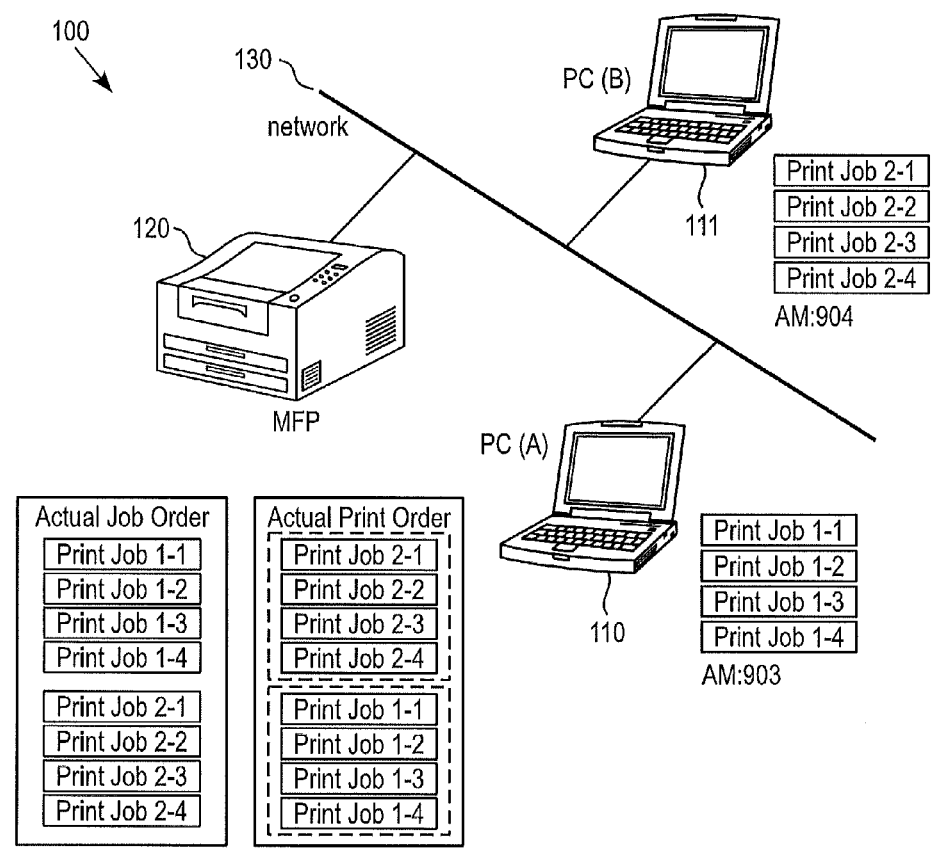
FIG. 1B is an illustration of a data processing system, which includes a plurality of client devices, and an image forming apparatus or printer.

FIG. 1B is an illustration of the data processing system 100 as shown in FIG. 1A, which includes a plurality of client devices 110, 111 and an image forming apparatus or printing device 120. As shown in FIG. 1B, in accordance with an exemplary embodiment, the data processing system consists of a plurality or multiple client devices (or PCs) 110, 111 that send sequence of print jobs to an image forming apparatus (or printing device) 120. Each of the plurality of client devices 110, 111 and the image forming apparatus (or printing device) 120 is preferably connected to one another via a network connection 130. It can be appreciated that the as shown, the sequence of print jobs transmitted or sent by the client devices and received by the image forming printing device may come in the same order. However, once again, depending on complexities of each of the print jobs, less complex print jobs can be processed (i.e., RIPped) faster and becomes available for printing before the more complex print jobs. Therefore, the job orders can change after the RIP process.

In accordance with an exemplary embodiment, each of the plural print jobs can be divided into multiple sub-print jobs, and wherein a print job management module 200 (FIG. 2) can be used to manage the plurality of print jobs. For example, as shown in FIG. 1B, one or more of the plurality of client devices 110, 111 can generate a print job 1 and print job 2 (print job 1-1, 1-2, 1-3, 1-4, and print job 2-1, 2-2, 2-3, 2-4). In accordance with an exemplary embodiment, each of the print jobs 1, 2 can be separated into one or more sub-print jobs.

Figure 2:
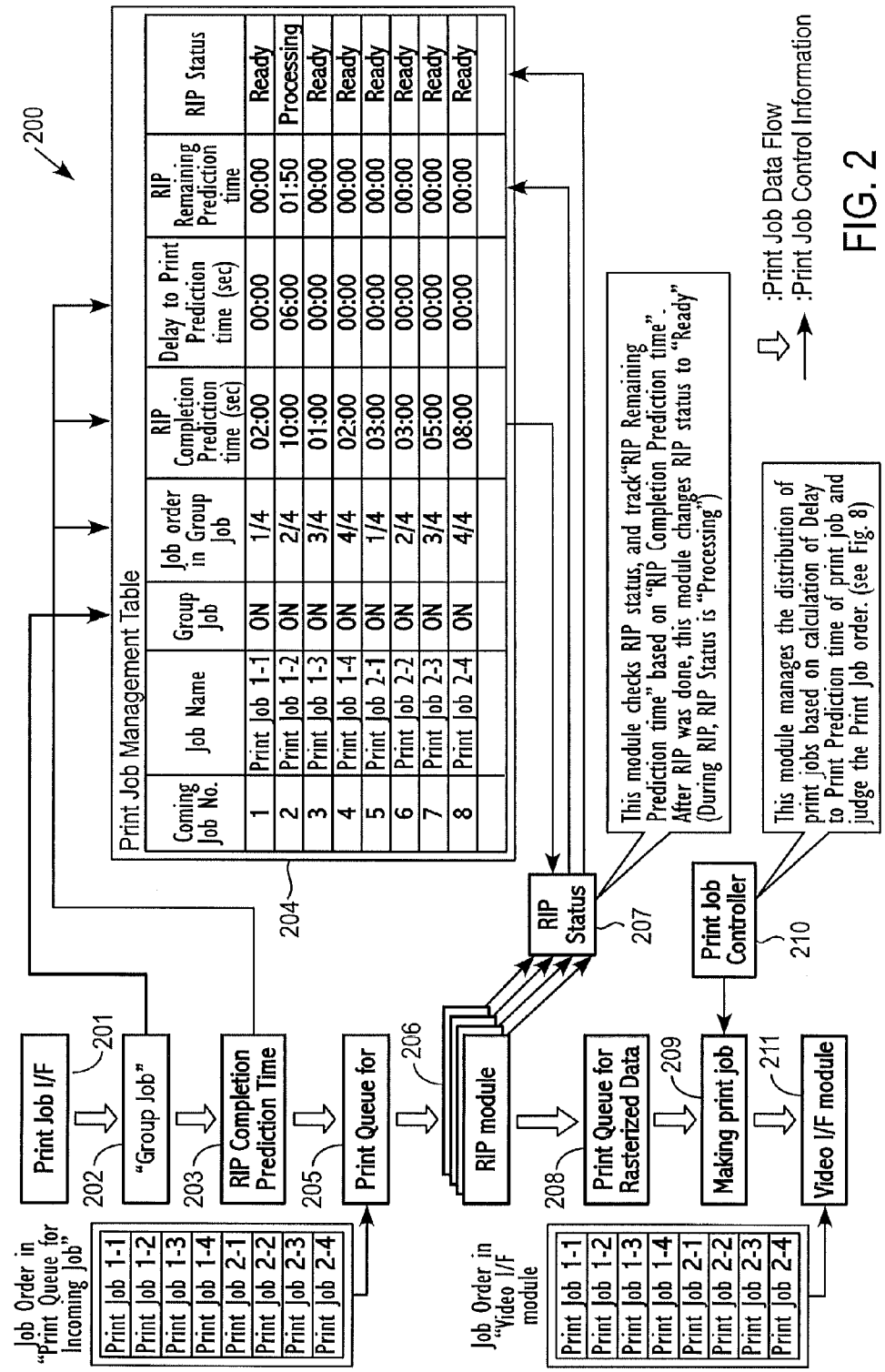
FIG. 2 is an illustration of the print job management module in accordance with an exemplary embodiment.

FIG. 2 is an illustration of the print job management module 200 in accordance with an exemplary embodiment. In accordance with an exemplary embodiment, the print job management module 200 is part of the firmware of the image forming apparatus or printing device 120 and includes a print job I/F (interface) a group job module 202, a processing (or RIP) completion prediction time module 203, a print job management table 204, a print queue 205, a processing module (or RIP module) 206, a processing (or RIP) status updating module 207, a print queue for rasterized data 208, a making print job module 209, a print job controller 210, and a video I/F (interface) module 211.

As shown in FIG. 2, as incoming print jobs received, the Group Job checking module 202 determines the type of the print job. If the print job is determined to have a Group Job attribute with a parameter value "ON" or enabled, it can then be assumed that it is a part of a job and is said to be a sub-print job. The sub-print job will then be assigned to a group job module or manager 202, which then collects all the sub-print jobs and manages the job order in the group. The RIP Completion time prediction module 203 receives the print job or sub-print job, analyses the data complexity and provides the best estimated time it may take to complete the ripping process. Once the RIP Completion Prediction time has been determined, a Delay to Print Prediction time is calculated. The Delay to Print Prediction time is calculated based the RIP Completion Prediction time minus (the cumulative Print intervals minus first Print interval) minus Start time of first print job. If the calculated Delay to Print Prediction time is greater than 0 (>0), the print engine must 124 wait and will resume until the current RIP process is complete. If the calculated Delay to Print Prediction time is less than or equal to 0 (<=0), the print engine 124 can maintain the highest throughput (see FIG. 8A).

The RIP module 206 processes (ripping) each of the sub-print jobs in the same manner as any other print jobs. During the ripping process, the RIP Status Updating module 207 monitors the process time and will then update the RIP remaining prediction time and provides update to the RIP status. All the RIPped jobs will temporarily be stored in the Print Queue for Rasterized Data 208. Simultaneously, a checking mechanism called Print Job Controller 210, which particularly tracks the group job and determines the order of the print jobs in the group can achieve the best printing performance. In accordance with an exemplary embodiment, the Print Job Controller 210 checks the Delay to Print Prediction time, the RIP Status and analyzes the subsequent print job in the group job can be ready to release to print in a manner that print engine downtime can be minimized.

As shown in FIG. 2, both Print Job 1 and Print Job 2 consists of multiple sub-print jobs, print job 1-1, print job 1-2, print job 1-3, print job 1-4, print job 2-1, print job 2-2, print job 2-3, print job 2-4, respectively. For example, the RIP Completion Prediction time as 2, 10, 1, 2, 3, 3, 5, 8 seconds respectively; given a print engine with throughput is equal to (=) 30 ppm (pages per minute), the Delay to Print Prediction time is calculated as 0:00, 5:00, 0:00, 0:00, 0:00, 0:00, 0:00, 0:00 seconds, respectively. In accordance with an exemplary embodiment, if the Print Job Controller 210 determines that print job 1-2 causes the print engine 124 to pause, or the print engine 124 will be placed in an idle or wait mode, the Print Job Controller 210 can decide to delay the printing of the group of print job 1 (e.g., print job 1-1, print job 1-2, print job 1-3, and print job 1-4) until the processing of print job 1-2 (e.g., RIP) is complete. In accordance with an exemplary embodiment, the Print Job Controller 210 sends the plurality of sub-print jobs of Print job 2 (print job 2-1, print job 2-2, print job 2-3, and print job 2-4) to print immediately (FIG. 8B)

FIG. 3 is an illustration of a flowchart 300 describing the process of the Group Checking module 202 and the RIP Completion time prediction module 203. As shown in FIG. 3, the process begins in step 301, wherein the group job checking module 202 is activated. In step 302, the group job checking module 202 checks to determine if any print jobs are in the "print job I/F" (i.e., "print job interface"). If the print job I/F does not contain any print jobs, the process stops and the process is repeated until a print job is received. In step 303, once the print job I/F includes at least one print job, the group job checking module 202 checks the print job for a "group job" flag and/or other indication that the print job includes sub-jobs (or sub-print jobs). In step 304, if the print job does not include a "group job", in step 306, the group job checking module 202 writes the "group job" designation for the print job as "off", and the print job is sent for processing to the "print job management table" 204 and to step 313, "Print Queue for Coming Job". Alternatively, in step 305, if the print job includes a "group job" flag (i.e., write group job "ON"), in step 307, the Group Job checking module 202 checks the "job order in the group job". In step 308, the job order in group job is then written to the Print Job Management Table 204. In step 309, a "RIP completion prediction time" based on the print jobs PDL (page description language) is calculated. In step 310, "RIP completion Prediction Time" is written to the "Print Job Management Table" 204. In step 311, the "Delay to Print Prediction time" is calculated. In step 312, the "Delay to Print Prediction time" is written to the "Print job management table" 203. In step 313, the print job is sent to the "Print Queue for Incoming Job".

FIG. 4 is an illustration of a flowchart, which described the process 400 in the RIP module 206 in accordance with an exemplary embodiment. As shown in FIG. 4, in step 401, the RIP module 206 is activated. In step 402, the RIP module 206 determines if there are any print jobs in the "Print Queue for Coming Job" 205. If a print job is in the "Print Queue for Coming Job", in step 403, processing RIP certain lines is performed. In step 404, an update processing time and report progress to "RIP status updating module" 207 is sent. In step 405, the RIP module 207 determines if the RIP processing is finished. If the RIP processing is not finished, the process returns to step 403. Alternatively, if the RIP processing is finished, in step 406, print information is sent to RIP status updating module indicating that RIP (i.e., processing) is completed (i.e., done). In step 407, the print job is sent to "Print Queue for Rasterized Data" 208.

FIG. 5 is an illustration of a flowchart, which describes the process 500 in the RIP status updating module 207. In step 501, the process of the RIP status updating module 207 is activated. In step 502, the RIP status updating module 207 determines if there is any updating information from "RIP module" 206 to "RIP status updating" 207. If not, the process returns to step 502. If the answer is yes (e.g., updating information is available), in step 503, the "RIP remaining time" based on "RIP completion prediction time" and the information from the RIP module is calculated. In step 504, the RIP status updating module 207, obtains information on whether the RIP (i.e., processing) is completed from the "RIP module" 206. If the process is not completed, the process returns to step 503, and if the process is completed, in step 505, the RIP remaining time and RIP status is written to the print job management table 203.

FIG. 6 is an illustration of a flowchart, which describes the processing 600 of the sub-print jobs within the print job controller 210. As shown in FIG. 6, in step 601, the print job controller 210 inquires if there are any print jobs in the print job management table 203. If there is no print jobs in the print job management table 203, the process stops. If the print job management table 203 includes at least one print job, in step 602, the print job controller 210 determines if the print job is in the top of the table of "Group-On Jobs". If the answer is no, the print job is sent to step 610, wherein it is indicated that the complete print job in the Group Job has been received. Alternatively, if the answer in step 602 is yes, in step 603, the print job controller 210 determines if the all of the "Group Job" equal "ON" job has been completed. If the answer is no, the print job returns to step 602. Alternatively, if the answer is yes, in step 604, the print job controller 210 checks the "RIP Status" on the print job management table 203. In step 605, the number of "Processing" is the last one. If no, the process returns to step 604. If yes, the process proceeds to step 609, get the Delay to Print Prediction Time in the Print Job Management table and store to "T(d) only if greater Delay to Print time "T(d)". In step 607, the RIP Completion Prediction time is retrieved from the Print Job Management table and is stored in memory. In step 608, the Delay to Print Prediction Time is retrieved from the Print Job Management table and store in memory. In step 609, if the Delay to Print Prediction Time in the Print Job Management table and store to "T(d) only if greater Delay to Print time "T(d) then the process proceeds to step 610, wherein all job in the Group Job, which are completed are received. In step 611, the Group Job is moved to a temporary buffer.

FIG. 7 is an illustration of a flowchart describing the process of print job order in the Print Job Controller 210 in accordance with an exemplary embodiment. In step 701, the Print Job Controller 210 is activated. In step 702, the Group Jobs in the temporary buffer are read. In step 703, if there are any print jobs in the temporary buffer, the process continues to step 704. If no, the process returns to step 702. In step 704, the Print Job Controller 210 determines if any of the print jobs have a Delay to Print Prediction time. If no, the process continues to step 707. If yes, the Print Job Controller 210 determines if the Delay to Print Prediction Time is greater than zero (0). If yes, the process continues to step 707. If no, the print job (or print information) is sent to step 706, which immediately sends the print job to the "Making Print Job Module" 209 for printing. In step 707, the RIP Status in the Print Job Management table for the print job to be checked. In step 708, it is determined, if the RIP Status is ready. If no, the process returns to step 707. If yes, the process proceeds to step 709, wherein the print job is sent to the "Making Print Job Module" 209.

Figure 8A:
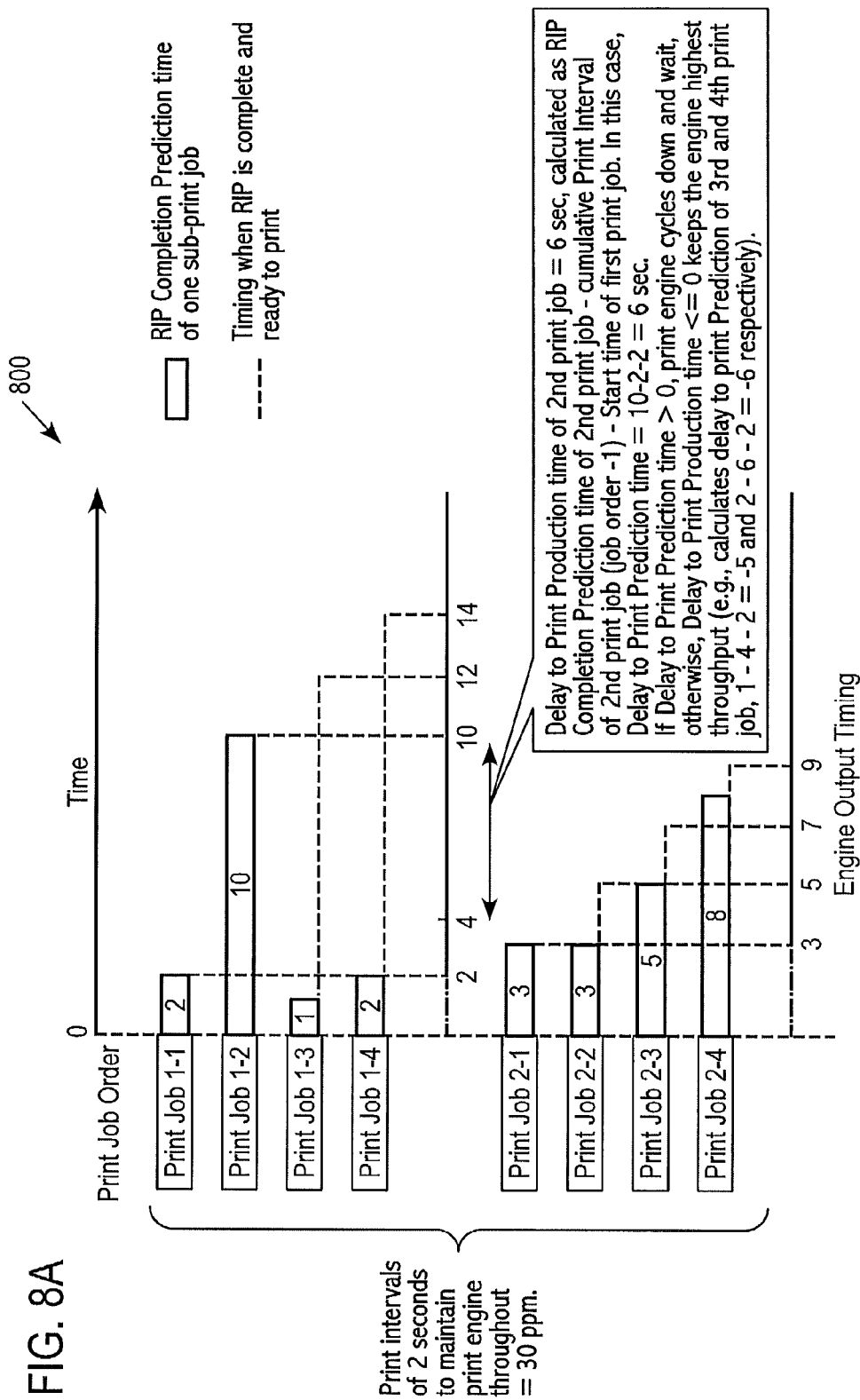
FIG. 8A is an illustration of a data processing showing the analysis of delay to print prediction time on the given print intervals in accordance with an exemplary embodiment.
Figure 8B:
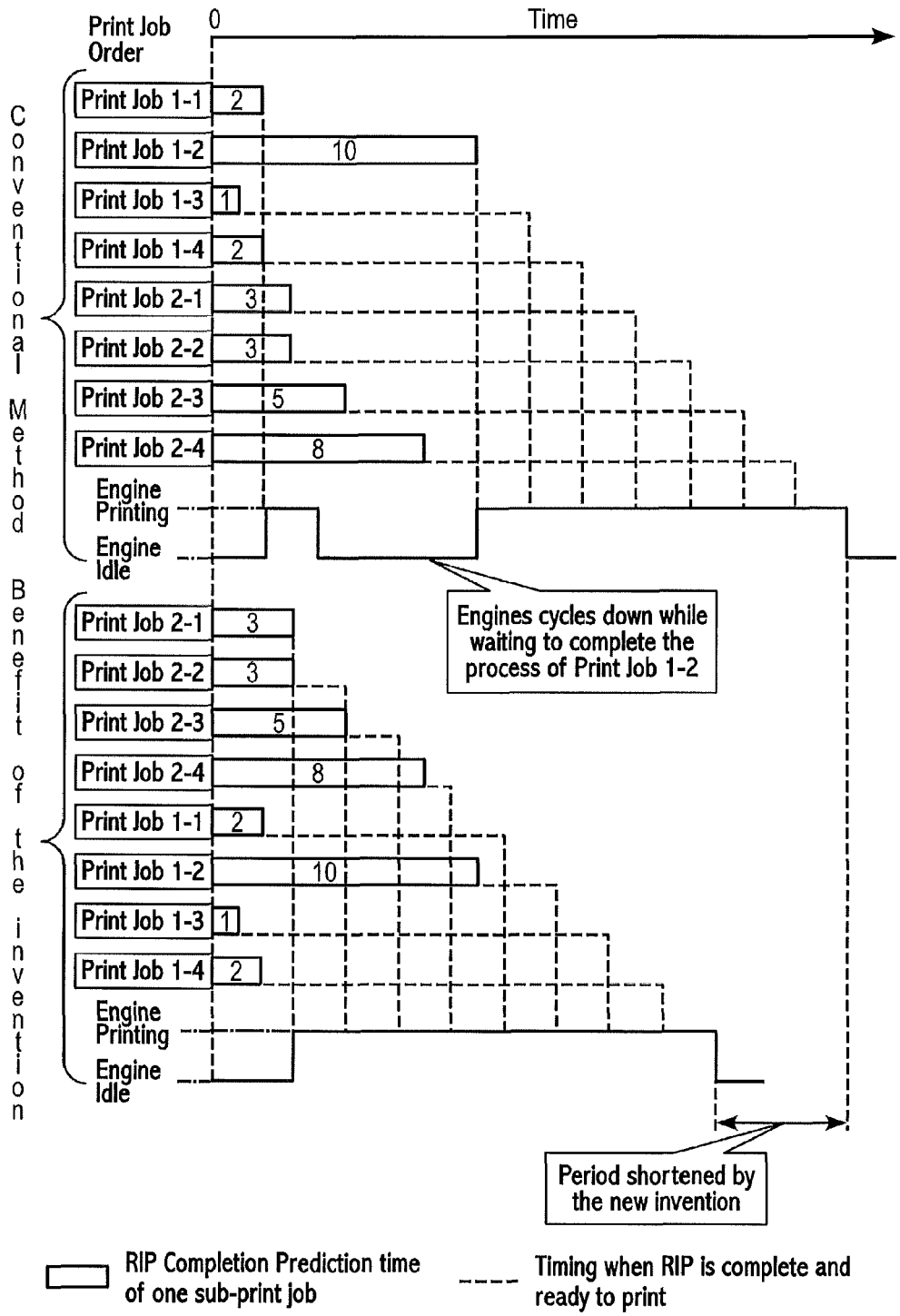
FIG. 8B is an illustration of timing example showing the benefit of an exemplary embodiment over a known or conventional method.

FIG. 8A is an illustration of a data processing 800 showing the analysis of Delay to Print Prediction time on the given print intervals in accordance with an exemplary embodiment. As shown in FIG. 8A, the print jobs, Print Job 1 and Print Job 2 include sub-jobs (Print Job 1-1, Print Job 1-2, Print Job 1-3, Print Job 1-4, Print Job 2-1, Print Job 2-2, Print Job 2-3, and Print Job 1-4). For example, as shown, the print intervals are 2 seconds to maintain print engine throughput of approximately 30 pages per minute (ppm). As shown, the delay to print prediction time of Print Job 2 is approximately 6 seconds, calculated as RIP Completion Prediction time of 2nd print job minus cumulative Print Interval of 2nd print job (job order −1) minus Start time of first print job. In this case, Delay to Print Prediction time=10 minus 2 minus 2=6 sec.

In accordance with an exemplary embodiment, if Delay to Print Prediction time is greater than 0 (>0), print engine cycles down and wait, otherwise, Delay to Print Prediction time is less than or equal to 0 (<=0) keeps the engine highest throughput (e.g., calculates delay to print Prediction of 3rd and 4th print job, 1 minus 4 minus 2=minus 5 and 2 minus 6 minus 2=minus 6, respectively).

FIG. 8B is an illustration of timing example showing the benefit of the exemplary embodiments as disclosed herein and a conventional method for printing two or more print jobs. As shown in FIG. 8B, in a conventional printing process, if two or more print jobs are received by a printer or image forming apparatus, the two or more print jobs are printed in order of receipt. In a conventional method, the two or more print jobs are divided into a plurality of sub-print jobs (print jobs 1-1, 1-2, 1-3, 1-4 and print jobs 2-1, 2-2, 2-3, 2-4). As shown, if print job 1 begins printing upon completion of the processing of sub-print job 1-1, the print engine 124 would cycle down or be paused while waiting for the processing of sub-print job 1-2, and would resume printing upon completion of the processing of sub-print job 1-2, and would continue with the printing of the remaining sub-print jobs 1-2, 1-3, 1-4, 2-1, 2-2, 2-3 and 2-4.

Alternatively, as shown in the new exemplary embodiment, by the print of the second print job, for example, print job 2 having sub-print jobs 2-1, 2-2, 2-3 and 2-4 before printing of print job 1, which includes sub-print jobs 1-1, 1-2, 1-3, and 1-4, the print engine 124 does not have any wait time and the print time for print jobs 1 and 2 is shortened.

In accordance with an exemplary embodiment, the method as disclosed herein can include a functionality, wherein printing a subsequently received print job is performed, only if the processing and delay to print times of an earlier received print job is greater than the processing and delay to print times of the subsequently received print job. In addition, the method can include a process of printing each of the two or more print jobs in a print sequence generated based on a time of receipt by the image forming apparatus of each of the two or more prints jobs, if the processing and delay to print times of the two or more are approximately equal. In accordance with an exemplary embodiment, the generating of the plurality of sub-print jobs can be performed on a printer driver of a client device 110, or alternatively, on the printer controller of the image forming apparatus 120.

In accordance with another exemplary embodiment, a computer program product comprising a non-transitory computer usable medium having a computer readable code embodied therein for managing a plurality of print jobs on an image forming apparatus is disclosed, the computer readable program code configured to execute a process, the process comprising the steps of: receiving two or more print jobs on an image forming apparatus; dividing each of the two or more print jobs into a plurality of sub-print jobs for printing by a print engine of the image forming apparatus; determining an estimated processing time and an estimated delay to print time for each of the sub-print jobs; managing the printing of each of the two or more print jobs based on the estimated processing time and the estimated delay to print time for each of the sub-print jobs by determining a printing priority for the two or more print jobs based on a printing sequence, which reduces down time of the print engine of the image forming apparatus; and printing the two or more print jobs based on the determined printing priority.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. For instance, the above mentioned embodiment is discussed in the condition where the multiple sub-print jobs are preliminary prepared in the client device 110, and they are sent to image forming apparatus 120. However, the present invention is not limited to this specific implementation; the present invention is applicable to the case where a single print job is forwarded from the client device 110 to the image forming apparatus 120, and then the image forming apparatus 120 separates or divides the single print job into multiple sub-print jobs before processing these sub-print jobs. In this alternative implementation, the image forming apparatus 120 can have the control of such separation of the single print job, and therefore, it is beneficial for the image forming apparatus 120 to decide how many sub-print jobs should be made in accordance with the resource conditions of the image forming apparatus 120. In view of the foregoing, it is intended that the present invention cover modifications and variations of this invention provided they fall within the scope of the following claims and their equivalents.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. The present invention includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to".

In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A method of managing plural print jobs, the method comprising:
   receiving two or more print jobs on an image forming apparatus;
   dividing each of the two or more print jobs into a plurality of sub-print jobs for printing by a single print engine of the image forming apparatus;
   determining an estimated processing time, an estimated delay to print time, and an estimated print duration for printing of the sub-print job for each of the sub-print jobs;
   managing the printing of each of the two or more print jobs based on the estimated processing time, the estimated delay to print time, and the estimated print duration for printing of the sub-print job for each of the sub-print jobs by determining a printing priority for the two or more print jobs based on a printing sequence, which reduces down time of the single print engine of the image forming apparatus; and
   printing the two or more print jobs on the single print engine of the image forming apparatus based on the determined printing priority.

2. The method of claim 1, comprising:
   assigning the plurality of sub-print jobs to a print job management module to determine the estimated processing time, the estimated delay to print time, and the estimated print duration for printing of the sub-print job for each of the sub-print jobs.

3. The method of claim 2, comprising:
   determining the printing priority of each of the two or more print jobs with a print job controller based on the estimated processing time, the estimated delay to print time, and the estimated print duration for printing of the sub-print job for each of the sub-print jobs received from the print job management module; and
   receiving the printing priority from the print job controller.

4. The method of claim 3, wherein the printer controller performs the following steps:
   comparing the estimated processing time, estimated delay to print time, and the estimated print duration for printing of the sub-print jobs of the sub-print jobs to determine the printing priority of the two or more print jobs; and
   sending the processed sub-print jobs to a print queue for printing in an order according to the determination of printing priority by the print job management module.

5. The method of claim 2, wherein the print job management module during processing of the sub-print jobs performs the following steps:
   dividing the plurality of sub-print jobs into a plurality of sub-print jobs;
   calculating the estimated processing time for each of the plurality of sub-print jobs;
   calculating the estimated delay to print time for each of the plurality of sub-print jobs; and
   calculating the estimated print duration for printing of the sub-print job for each of the plurality of sub-print jobs.

6. The method of claim 1, comprising:
   printing each of the two or more print jobs in a print sequence generated based on a time of receipt by the image forming apparatus of each of the two or more prints jobs, if the down time of the single print engine of the image forming apparatus is not affected by the print sequence.

7. The method of claim 1, comprising:
   generating the plurality of sub-print jobs on a printer driver of a client device.

8. The method of claim 1, comprising:
   generating the plurality of sub-print jobs on the printer controller, which is contained within the image forming apparatus.

9. An image forming apparatus having executable instructions for managing a plurality of print jobs, the instructions comprising:
   receiving two or more print jobs on the image forming apparatus;
   dividing each of the two or more print jobs into a plurality of sub-print jobs for printing by a single print engine of the image forming apparatus;
   determining an estimated processing time, an estimated delay to print time, and an estimated print duration for printing of the sub-print job for each of the sub-print jobs;
   managing the printing of each of the two or more print jobs based on the estimated processing time, the estimated delay to print time, and the estimated print duration for printing of the sub-print job for each of the sub-print jobs by determining a printing priority for the two or more print jobs based on a printing sequence, which reduces down time of the single print engine of the image forming apparatus; and
   printing the two or more print jobs on the single print engine of the image forming apparatus based on the determined printing priority.

10. The apparatus of claim 9, comprising:
    a print job management module, which is assigned the plurality of sub-print jobs and determines the estimated processing time, the estimated delay to print time, and the estimated print duration for printing of the sub-print job for each of the sub-print jobs.

11. The apparatus of claim 10, comprising:
    a print job controller configured to determine the printing priority of each of the two or more print jobs with a print job controller based on the estimated processing time, the estimated delay to print time, and the estimated print duration for printing of the sub-print job for each of the sub-print jobs received from the print job management module.

12. The apparatus of claim 11, wherein the print job controller performs the following steps:
    comparing the estimated processing time, estimated delay to print time, and the estimated print duration for printing of the sub-print jobs of the sub-print jobs to determine the printing priority of the two or more print jobs; and
    sending the processed sub-print jobs to a print queue for printing in an order according to the determination of printing priority by the print job management module.

13. The apparatus of claim 10, wherein the print job management module during processing of the sub-print jobs performs the following steps:
    dividing the plurality of sub-print jobs into a plurality of sub-print jobs;

calculating the estimated processing time for each of the plurality of sub-print jobs;

calculating the estimated delay to print time for each of the plurality of sub-print jobs; and calculating the estimated print duration for printing of the sub-print job for each of the plurality of sub-print jobs.

14. A computer program product comprising a non-transitory computer usable medium having a computer readable code embodied therein for managing a plurality of print jobs on an image forming apparatus, the computer readable program code configured to execute a process, the process comprising the steps of:

receiving two or more print jobs on an image forming apparatus;

dividing each of the two or more print jobs into a plurality of sub-print jobs for printing by a single print engine of the image forming apparatus;

determining an estimated processing time an estimated delay to print time, and an estimated print duration for printing of the sub-print job for each of the sub-print jobs;

managing the printing of each of the two or more print jobs based on the estimated processing time, the estimated delay to print time, and the estimated print duration for printing of the sub-print job for each of the sub-print jobs by determining a printing priority for the two or more print jobs based on a printing sequence, which reduces down time of the single print engine of the image forming apparatus; and printing the two or more print jobs on the single print engine of the image forming apparatus based on the determined printing priority.

15. The computer program of claim 14, comprising:

assigning the plurality of sub-print jobs to a print job management module to determine the estimated processing time, the estimated delay to print time, and the estimated print duration for printing of the sub-print job for each of the sub-print jobs.

16. The computer program of claim 15, comprising:

determining the printing priority of each of the two or more print jobs with a print job controller based on the estimated processing time, the estimated delay to print time, and the estimated print duration for printing of the sub-print job for each of the sub-print jobs received from the print job management module; and receiving the printing priority from the print job controller.

17. The computer program of claim 16, wherein the printer controller performs the following steps:

comparing the estimated processing time, estimated delay to print time, and the estimated print duration for printing of the sub-print jobs of the sub-print jobs to determine the printing priority of the two or more print jobs; and sending the processed sub-print jobs to a print queue for printing in an order according to the determination of printing priority by the print job management module.

18. The method of claim 15, wherein the print job management module during processing of the sub-print jobs performs the following steps:

dividing the plurality of sub-print jobs into a plurality of sub-print jobs;

calculating the estimated processing time for each of the plurality of sub-print jobs;

calculating the estimated delay to print time for each of the plurality of sub-print jobs; and calculating the estimated print duration for printing of the sub-print job for each of the plurality of sub-print jobs.

* * * * *